United States Patent [19]
Masclet et al.

[11] Patent Number: 5,323,930
[45] Date of Patent: Jun. 28, 1994

[54] METHOD OF DISPENSING A DETERMINED AMOUNT OF PARTICLES SUSPENDED IN A FLUID AND DEVICE FOR CARRYING OUT THIS METHOD

[75] Inventors: Georges J. A. Masclet, Epernay; Dominique A. P. Hennequin, Reims; Alain M. Houlmont, Plivot, all of France

[73] Assignee: Champagne Moet & Chandon, France

[21] Appl. No.: 904,838

[22] Filed: Jun. 26, 1992

[30] Foreign Application Priority Data

Jun. 28, 1991 [FR] France ............................ 91 08081

[51] Int. Cl.$^5$ .......................................... B67D 5/16
[52] U.S. Cl. .................................... 222/71; 141/9
[58] Field of Search .................. 222/71, 630; 141/67, 141/129, 44, 9

[56] References Cited

U.S. PATENT DOCUMENTS 4,655,265 4/1987 Deteurte et al. ..................... 141/9
5,033,644 7/1991 Tentler ................................ 222/71

FOREIGN PATENT DOCUMENTS 0179678 4/1986 European Pat. Off. .
3039210 5/1982 Fed. Rep. of Germany .

OTHER PUBLICATIONS

Patent Abstracts of Japan vol. 5, No. 62-561 4426 (Feb. 12, 1982).

*Primary Examiner*—Jesus D. Sotelo
*Attorney, Agent, or Firm*—Steinberg, Raskin & Davidson

[57] ABSTRACT

A method of and a device for dispensing a determined amount of particles in suspension within a fluid, the device comprising a column wherein is provided a fluidized bed of particles in suspension in a fluid and which is connected by at least one duct opening into one portion of the container wherein the fluidized bed is obtained to a device for the volumetric metering of the suspension taken from within the container, the device being arranged to communicate with a bottle adapted to receive a determined and accurate amount of particles, the device being applicable in particular to the preparation of champagne.

8 Claims, 1 Drawing Sheet

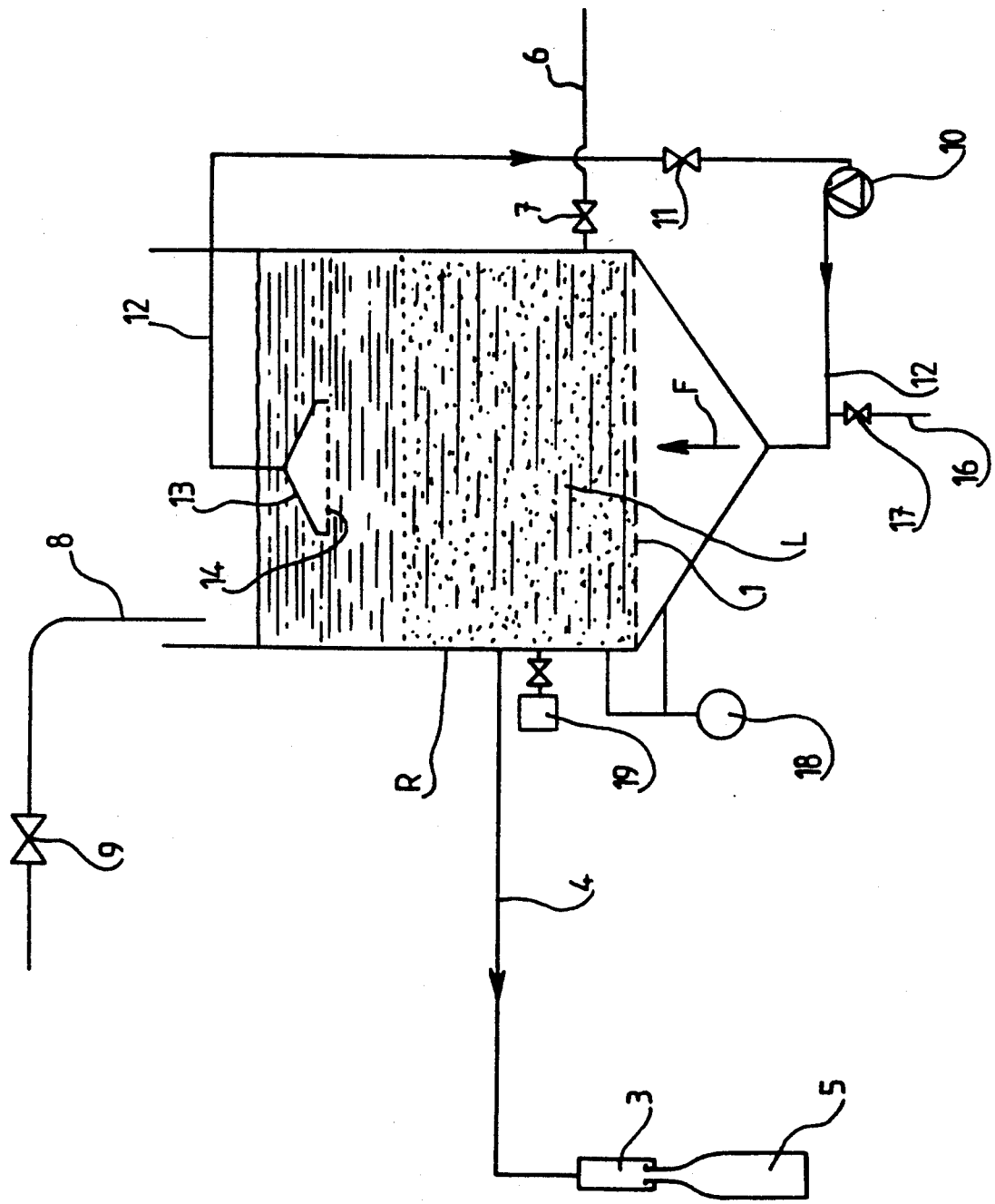

METHOD OF DISPENSING A DETERMINED AMOUNT OF PARTICLES SUSPENDED IN A FLUID AND DEVICE FOR CARRYING OUT THIS METHOD

The present invention relates generally to a method of dispensing a determined and accurate amount of particles suspended in a fluid.

It is also directed to a device for carrying out this method. A new technique has been used for several years for preparing champagne which dispenses with the step of shaking the bottles, which is a long and expensive operation.

This technique consists in including the yeasts required for the fermentation in the bottle into balls made from gelled alginate with a diameter of a few millimeters and which are inserted into the bottles.

The constitution and the gelled character, however, of these balls are such that it is very difficult to manipulate them when they are in bulk or loose, especially when they are in a moist state ready for use and therefore to meter them in a sufficiently accurate manner with the metering systems existing at present.

In other words it is necessary to solve the problem of the metering of the balls on the bottling lines with a sufficient accuracy and with a rate of work which may reach 20,000 bottles per hour while retaining the physical integrity of the balls.

To solve this problem there has already been proposed before metering the balls in the bottles to have them suspended in a liquid, the keeping in suspension being obtained by a mechanical stirring.

It has however, been found that the different tested mechanical stirring systems did not allow to obtain a homogeneous distribution of the balls within the liquid, incurred the risk of altering the physical integrity of the balls and in any case did not allow to obtain an accurate and reproducible metering of the balls within the bottles.

Therefore, the object of the present invention is to cope in particular with these inconveniences by providing a method and a device allowing to feed the bottles with a determined, accurate and reproducible amount of balls.

For that purpose the subject of the invention generally is a method of dispensing a determined amount of particles suspended in a fluid, the voluminal mass of the particles being higher than that of the said fluid, characterized in that the said suspension is a suspension obtained by providing a fluidized bed having a predetermined expansion corresponding to a determined concentration of particles in the fluid, whereafter one portion of this suspension is taken from the fluidized bed and is metered prior to using it for an application requiring the use of a determined amount of particles.

In other words the method of the invention allows to supply the volumetric metering system with a very accurate and reproducible amount of particles suspended in a fluid, which metering system may then release its content into any container whatsoever.

According to a particular characterizing feature of this method the aforesaid fluid is a liquid such for instance as wine.

It should be specified that the particles suspended in the fluid may for instance be balls of a gel of alginate into which are possibly incorporated yeasts.

The invention is further directed to a device for carrying out the method meeting either one of the characterizing features mentioned hereinabove and of the type comprising a container or like vessel or receiver such for instance as a column allowing to provide a fluidized bed of particles suspended in a fluid, characterized in that the said container is connected by at least one duct or pipeline opening into one portion of the container wherein the fluidized bed is formed to a device for the volumetric metering of the suspension taken from within the container, which metering device is adapted to communicate with a means requiring the use of a determined and accurate amount of particles. Such a means may consist of a bottle for example.

This device is further characterized in that the aforesaid container is fed with particles by at least one duct or pipeline opening into the said container.

This container is moreover supplied with fluid by at least one duct or pipeline connected to a source of fluid and opening into the container (R) preferably at the upper or top portion thereof.

It should further be specified here that the volumetric metering device is adapted to meter or proportion a suspension of particles consisting of balls of gel for instance such as a gel of alginate in suspension in a liquid such as wine.

The method and the device of this invention are applicable in particular to the preparation of an effervescent wine by a process referred to as the "champagnization method" requiring for the implementation of the new technique mentioned hereinabove the insertion into the bottles of an accurate amount of gel balls immobilizing or fixing yeasts.

The invention will be better understood and further objects, characterizing features, details and advantages thereof will appear more clearly as the following explanatory description proceeds with reference to the accompanying diagrammatic drawing given by way of non limiting example only illustrating a presently preferred specific embodiment of the invention and wherein the single FIGURE shows in a very diagrammatic manner an appliance or contrivance according to this invention.

Referring to this FIGURE there is shown a container R forming for instance a cylindrical column at the base or bottom of which is provided a grid or grate 1 above which may be formed through fluidization a homogeneous suspension of particles, for instance of particles of alginate gel possibly containing yeasts within a fluid such for example as a liquid consisting of wine.

The column R is connected to a volumetric metering or proportioning device diagrammatically shown at 3 through the medium of at least one duct or pipeline 4 the internal volume of which preferably is much smaller than the volume of a proportioned amount or batch to be dispensed by the device 3 and which is opening into one part of the column R wherein the fluidized bed is obtained.

The device 3 for the volumetric metering of the suspension taken from within the column R is arranged to communicate with a container such as a bottle 5 for instance intended to use a determined and accurate amount of particles to provide for instance a fermentation of the liquid contained within this bottle such as sweetened wine.

At 6 is shown a duct or pipeline fitted with a shutting or cut-off system 7 designed to allow or to stop the dispensing of particles in a suitable manner. This duct 6 is connected to a source of supply of particles (not shown) carried or conveyed for instance by the same fluid as the one present in the container R and opens into the lower or bottom portion of the column R above the grid or grate 1.

The supply with fluid such for instance as wine is performed by means of a duct or pipeline 8 fitted with valves 9 and opening into the container R for instance at the top or upper portion thereof.

A duct or pipeline 12 provided with a valve 11 and fitted with a pump 10 allows the recycling of the fluid (wine for instance) from the fluidized bed towards the lower part of the column R. At its end opening into the upper portion of the column R the duct 12 is provided with a part shaped for instance as a funnel 13 fitted with a grid or the like 14 which may retain the particles or balls likely to escape from the fluidized bed and which may let pass the overflow of liquid which is recycled through the duct 12 into the column R in order to maintain the fluidization.

At 16 has been shown a draining or emptying pipe with a valve 17; at 18 is shown an apparatus for measuring the differential pressure and at 19 is shown a detector or sensor for controlling the expansion of the fluidized bed formed within the column R.

Now for a better understanding of the invention the operation of the device just described will be briefly set forth hereinafter.

In the column R is provided a fluidized bed L having a predetermined expansion corresponding to a determined concentration of particles (balls of alginate gel) carried or conveyed through the duct 6 into a liquid (wine) itself conveyed through the grid 1 in the direction of the arrow F by the duct 8 and possibly by the duct 12.

When the determined and desired expansion for the use of the fluidized bed L will be reached, one portion of the fluidized bed will then be carried into the bottle 5 through the duct 4 and the volumetric metering device 3 which could be of any suitable kind whatsoever and adapted to meter or proportion a suspension of particles which in the particular application contemplated is a suspension consisting of balls of alginate gel in suspension in wine.

Thus the combination of the fluidized bed L and of the volumetric metering device 3 will allow to deliver into the bottle 5 which for example is a bottle of champagne a very accurate and very reproducible volume of particles or alginate gel balls.

The following non limiting example shows the much greater accuracy of the proportioning metering obtained with a combination of the fluidized bed and of the volumetric meterer in comparison with the volumetric metering of particles maintained in suspension through a mechanical stirring.

In a first step is provided the fluidization of a bed of alginate gel balls within water inside of the device diagrammatically shown on the single FIGURE. The internal diameter of the column R is 0.80 m, its height is 1.60 m and the distance between the grid or grate 1 and the point of taking of the fluidized suspension is 0.40 m.

The gel balls are consisting of calcium alginate and are prepared according to a known process. For example they are obtained by causing an aqueous solution of sodium alginate titrated to about 11 g/l to fall in drops into an aqueous solution of 60 g/l of calcium chloride. There occurs an exchange of ions between the sodium and the calcium thus resulting into the gelling of the drops in the form of balls. The contact with the solution of calcium chloride is maintained for about 30 minutes and then the balls are separated from the solution and are washed or rinsed with demineralized water.

The voluminal mass of these gel balls is 1.013 g/cm². They therefore are slightly denser than the water used in the present test.

The differential pressure gauge allows to measure the loss of pressure of the water when it is flowing through the bed of balls whereas a flowmeter (not shown on the FIGURE) allows to compute the velocity or speed of the water within the fluidization area of the bed contained within the column R.

The results observed for both categories of balls of differing mean sizes of 2.6 mm and 1.7 mm, respectively, are given in the table I.

TABLE I

| Mean diameter of the balls (mm) | 2.6 | 1.7 |
|---|---|---|
| End falling speed (cm/s) | 1.5 ± 0.09 | 1.09 ± 0.07 |
| Height of the bed of balls at rest (cm) | 70 | 70 |
| Minimum speed of fluidization (mm/s) | 1.02 | 0.52 |
| Maximum speed of homogeneous fluidization (mm/s) | 10 | 7 |

The end speed of fall of the balls is determined by measuring within a swarm of balls of substantially like sizes the average time of fall of these balls into the water at rest over a determined height and without any initial speed.

The minimum speed of fluidization is the velocity of the water beyond which the bed of balls begins to lift itself, i.e. when the porosity of the bed begins to increase. It may be easily detected or sensed by means of the differential pressure gauge 18.

Indeed when the speed of the water flowing through the bed of balls in the device increases from the initial zero value the loss of pressure of the water on either side of the bed is increasing and then becomes substantially constant as soon as the bed starts to rise itself during the homogeneous fluidization. It is therefore sufficient to sense the speed of the water at the start of the stabilization of the differential pressure.

The maximum speed of homogeneous fluidization is the one beyond which the porosity of the fluidized bed is no longer homogeneous. This phenomenon is reflected at the pressure gauge in a new increase of the pressure loss of the water. This maximum pressure in the case of the present test is equal to about the two thirds of the end speed of fall.

In a second stage with the fluidized bed of gel balls forming a suspension of these balls in the water and being maintained in a homogeneous condition, samples of 20 ml each one of this suspension are taken by means of a volumetric metering device such as the one disclosed for instance in the French patent application publications FR-A-2,613,782 and 2,639,066.

The weight of the balls thus taken has been measured over every ten samples. The results for 149 measurements are given in Table II.

By way of comparison there has been provided a suspension of balls in water by means of a mechanical stirring, the other conditions being similar: size and initial amount of balls, volume of the suspension. One takes the same number of samples by measuring on every ten samples the weight of the balls taken from.

It should be noted that various modes of mechanical stirring have been used. The results relating to the mechanical stirring given in Table II are those corresponding to the best stirring mode, i.e. the one leading to the smallest standard deviation between the different weights of balls for each sample taken from.

TABLE II

| Suspension mode | Balls taken from the fluidized bed system | Balls taken from the mechanically stirred system |
|---|---|---|
| Mean weight of balls per sample (g) | 3.920 | 4.160 |
| Maximum weight (g) | 4.350 | 4.920 |
| Minimum weight (g) | 3.580 | 3.500 |
| Standard deviation | 0.150 | 0.260 |

It thus clearly appears from this Table that the method according to the invention for metering a suspension of particles in a fluid, i.e. performed from a fluidized bed is very definitely more accurate as to the amount of particles dispensed by the volumetric metering device than the known metering method performed from a suspension of particles provided by a mechanical stirring, which represents a quite surprising and unexpected advantage.

Furthermore the method of the invention allows to very simply adjust the mean quantity of particles dispensed at each sampling by varying the speed of the fluid between the minimum speed of fluidization and the maximum speed of homogeneous fluidization since in this speed interval the porosity of the fluidized bed, i.e. the concentration of particles in the zone of the bed varies in a substantially linear manner versus the speed of the fluid.

It should be understood that it could be possible to proceed in the same fashion by replacing the water with wine the voluminal mass of which is slightly lower than 1 g/cm$^2$ when into the bottles should be inserted an accurate amount of balls of a gel of calcium alginate containing immobilized or fixed yeasts with a view to provide frothering or sparkling according to the process referred to as the "champagnization method" by the technique disclosed in particular in the French patent application publication FR-A-2,432,045.

The insertion indeed of a very accurate amount of such balls of alginate into a bottle of champagne for providing frothering or sparkling allows after turning down the bottles, i.e. after turning the bottle with its neck directed downwards to assuredly extract by freezing the content of the neck all the balls having previously served the purpose of providing frothering or sparkling. In other words one is sure that the bottle of champagne after having been recorked does no longer contain any ball and under any assumption the freezing of the content of the neck could be effected over the most possible reduced neck height which is advantageously limiting the loss or waste of wine.

There has therefore been provided according to the invention a method of and a device for dispensing a determined and very accurate amount of solid particles in homogeneous suspension in a liquid such as wine through the agency of a volumetric metering device within any container whatsoever such for example as a bottle or a tin or can.

The invention is of course not at all limited to the embodiment described and illustrated which has been given by way of example only.

Thus on the periphery of the container or of the column R having a fluidized bed may be provided a plurality of ducts such as previously mentioned duct 4 opening into one part of the column wherein the fluidized bed is obtained with a determined expansion, these ducts being connected to as many of volumetric metering devices of the suspension in the bottles 5. Likewise the ducts feeding the container R with particles and with fluid may be in any number whatsoever as well as the apparatus for controlling the fluidized bed within the said container.

Likewise the method and the device according to the invention may be used for any kinds of particles of very various sizes and voluminal masses and the fluid may be a liquid or a gas.

This means that the invention comprises all the technical equivalents of the means described as well as their combinations if the latter are carried out according to its gist and within the scope of the appended claims.

What is claimed is:

1. A method of dispensing a determined amount of particles in suspension in a fluid, wherein the improvement consists in that the said suspension is a suspension obtained by providing a fluidized bed having a predetermined expansion corresponding to a determined concentration of particles within the fluid, the voluminal mass of the particles being greater than that of the said fluid, whereafter at least one portion of this suspension in the fluidized bed is taken and is metered before using it for an application requiring the use of a determined amount of particles.

2. A method according to claim 1, wherein the aforesaid fluid is wine.

3. A method according to claim 1, wherein the particles in suspension in the fluid are balls of an alginate gel or an alginate gel having yeast incorporated therein.

4. A device for dispensing a determined amount of particles in suspension within a fluid comprising a container allowing the provision of the fluidized bed of particles in suspension in a fluid, wherein the improvement consists in that the said container is connected by at least one duct opening into a one portion of the container wherein the fluidized bed is being formed to a device for the volumetric metering of the suspension taken from the container, which device is adapted to communicate with a means intended to use a determined and accurate amount of particles and consisting of a bottle.

5. A device according to claim 4, wherein the inner volume of the duct connected to the volumetric metering device is much smaller than the volume of the metered amount to be dispensed by the said device.

6. A device according to claim 4, wherein the aforesaid container is fed with particles by at least one duct opening into the said container.

7. A device according to claim 4, wherein the container is further fed with fluid through at least one duct connected to a source of fluid and opening into the container into the upper portion thereof.

8. A device according to claim 4, wherein the volumetric metering device is adapted to meter or proportion a suspension consisting of balls of an alginate gel in suspension in wine.

* * * * *